Nov. 7, 1950  R. F. MITCHELL  2,528,840
MOTION-PICTURE CAMERA HAVING COUPLED DRIVE AND MASKING
MEANS FOR TAKING DIFFERENT SIZE EXPOSURES
Filed Nov. 4, 1948  2 Sheets-Sheet 1

Witnesses.  INVENTOR.

Nov. 7, 1950  R. F. MITCHELL  2,528,840
MOTION-PICTURE CAMERA HAVING COUPLED DRIVE AND MASKING
MEANS FOR TAKING DIFFERENT SIZE EXPOSURES
Filed Nov. 4, 1948  2 Sheets-Sheet 2

Witnesses.

INVENTOR.
Reginald Laurie Mitchell

Patented Nov. 7, 1950

2,528,840

UNITED STATES PATENT OFFICE 2,528,840

MOTION-PICTURE CAMERA HAVING COUPLED DRIVE AND MASKING MEANS FOR TAKING DIFFERENT SIZE EXPOSURES

Reginald Fawn Mitchell, Mount Vernon, N. Y.

Application November 4, 1948, Serial No. 58,205

3 Claims. (Cl. 88—18)

1

The trend of camera development steadily is toward smaller and more precise cameras which embody a maximum of convenience with a minimum of size and yet which are so exactly made that pictures are obtained meeting modern standards of definition and quality. This invention specifically covers an important advance in this direction and permits the design of a "vest-pocket" camera which will take either movies on regular size (single) movie frames or what are commonly known as "Magi-Eye" sequence strips of double-frame size or single shots of either size.

In order to do all this—and especially with a camera of such small size—certain very rigid requirements must be met.

It is an object of this invention to combine, in a small space, the means whereby the above-mentioned types of pictures may be taken with a single camera of very small size.

Specifically it is an object of this invention to provide a mechanism which incorporates a gear change assembly between the film intermittent and the shutter so that the intermittent will feed either one or two frames in front of the film aperture for each exposure cycle of the shutter.

At the same time it is an important object of the invention to mask or un-mask both the camera aperture and the finder aperture automatically as the gear change mechanism is operated. However, it is also an object of the invention to provide means whereby interchangeable single or double-frame operation, with automatic masking or un-masking of both camera and finder apertures, may be had without the necessity of having a gear change mechanism between the intermittent and the shutter. Particularly is it an object of this invention to enable this interchangeable type of operation to be done with a very small camera simply, efficiently and smoothly with a fool-proof interlocking mechanism.

Other features will be apparent from study of the specification.

2

Figure 1:
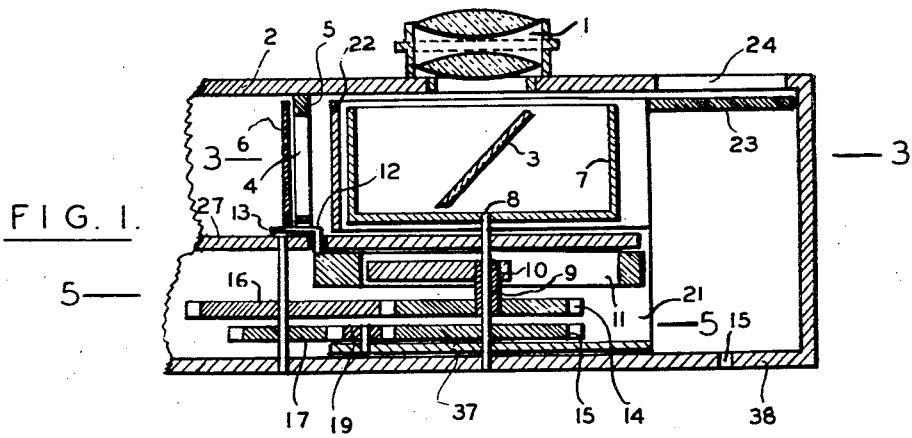
Fig. 1 shows one arrangement of a compact camera in which the intermittent cam shaft is hollow and in which revolves the shutter shaft, part of the gear change between the intermittent and shutter and the essential parts of the piece or assembly which holds the gear change and the aperture and finder masks.
Figures 3, 4:
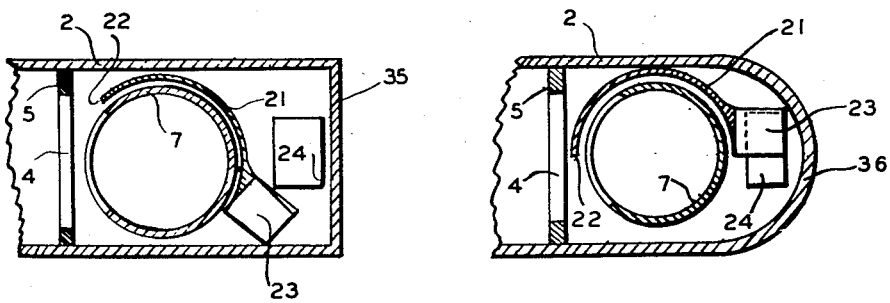

Fig. 3 shows a partial section of Fig. 1 and indicates one way in which a combination aperture and finder mask piece may operate in a very confined space. Fig. 3 shows the masks in the open position which leaves both apertures unmasked for double-frame operation.

Fig. 4 is similar to Fig. 3 except that it shows the combination mask piece in position masking both the camera and finder apertures as is necessary for single-frame (regular movie) operation.

Figure 5:
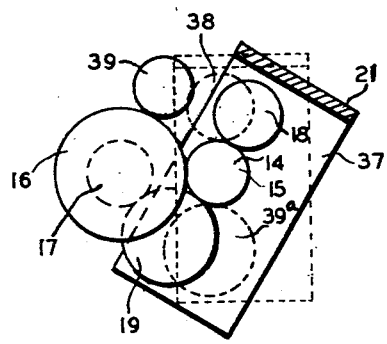

Fig. 5 shows another partial section of Fig. 1 and indicates the single-frame and the double-frame positions of the gear change between the intermittent driving and shutter driving gears.

Figure 2:
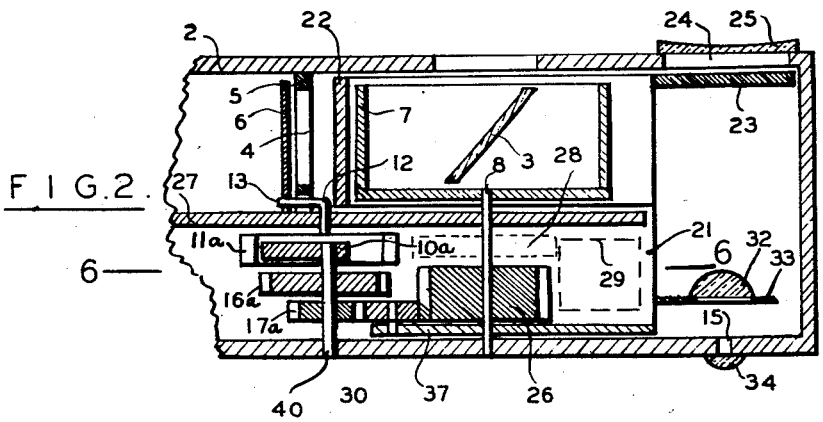
Fig. 2 shows a somewhat similar camera in which the intermittent and shutter shafts are separated and in which an alternative type of finder masking means is shown.
Figure 6:
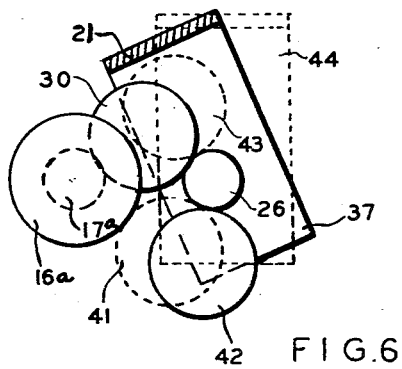

Fig. 6 is a partial section of Fig. 2 and indicates the single-frame and the double-frame positions of another arrangement of a gear change between the intermittent and shutter gears.

Figure 7:
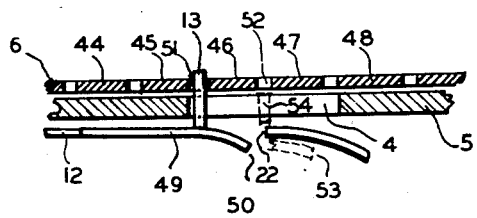

Fig. 7 shows a partial section of the film and aperture plate of a camera utilizing a special flexible type of intermittent shuttle support which co-acts with the aperture mask to provide either single-frame or double-frame operation without the necessity of using a gear change as previously. Fig. 7 shows the setting for single-frame operation with the shuttle tooth at the beginning of the film feeding stroke.

Figure 8:
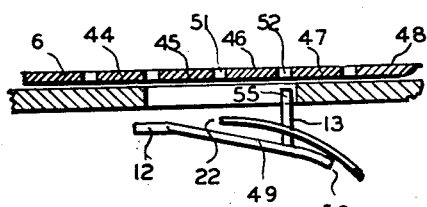

Fig. 8 is the same as in Fig. 7 except that it shows the shuttle tooth at the end of a double-frame stroke during which it has fed only one frame of film in front of the camera aperture.

Figure 9:
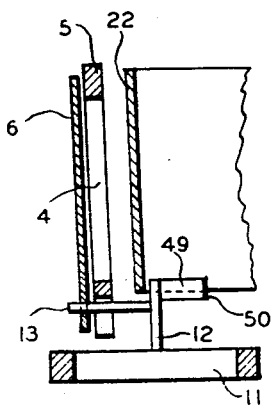

Fig. 9 shows a partial vertical section of the co-acting parts indicated in Figs. 7 and 8 and shows how the flexible shuttle tooth support engages with the aperture mask piece to function as described.

Figure 10:
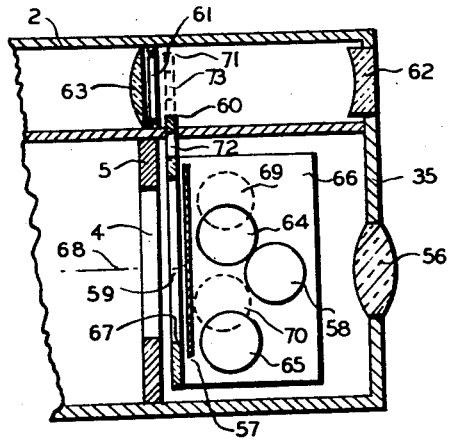

Fig. 10 shows a partial arrangement of a compact camera using the general principles of this invention but in which the gear change and combination aperture mask unit is moved in a straight line instead of the pivoting type of action covered previously.

In Fig. 1 the camera lens 1 is mounted on the side 2 of the camera case and the image of the object is reflected by a mirror 3 or prism to the camera aperture 4 in the aperture plate 5 and thus on to the film 6 at the aperture. A special rotary shutter 7, such as covered by my co-pending application Serial No. 785,326 of November 12, 1947, mounted on the shutter shaft 8, rotates in close proximity to the aperture 4. The shutter shaft 8 revolves inside a hollow cam shaft 9 on which is mounted the cam 10 which operates the intermittent shuttle 11. On the intermittent 11 is a support 12 which carries the shuttle tooth or claw 13 which moves the film 6 intermittently past the aperture 4. Also on the cam shaft 9 is mounted the cam gear 14 which is driven by the large gear 16. On the gear 16 is a gear 17 which has one half as many teeth as the gear 16 so this makes a 2:1 compound gear assembly and where the small gear 17 drives the shutter gear 15 when double-frame operation is set up. For the sake of clarity, Fig. 1 shows only some of the gears so the action of the gear change requires Fig. 5 also to be considered in connection with the following explanation. Fig. 5 shows how the intermediate gear 19 drives the shutter gear 15 and is driven by the small gear 17 when the gear change is set so the cam shaft gear 14 is driven by the large gear 16 at twice the speed of the shutter shaft gear 15. As may be seen by reference to Fig. 3, at this setting, the aperture mask 22 and the finder mask 23 are in the "open" position so that the camera will photograph a double-size frame at the aperture 4—the intermittent 11 feeding two frames past the aperture for one exposure cycle of the shutter 7. Fig. 3 shows also how the aperture mask 22 and the finder mask 23 are on a single piece or assembly which pivots about the same axis as the shutter shaft 8 and the cam shaft 9 and how the end 22 of the aperture mask clears the film aperture 4 when in the "open" double-frame operating position. Fig. 1 shows how the piece 21 holding the masks 22 and 23 is mounted on the member 37 which carries the gear change idlers 19 and 18. The idler 18 is not engaged with the gear 39 when in the "open" double-frame operating position but it naturally is always engaged with the shutter gear 15, as is the other idler gear 19. In the particular camera arrangement shown in Fig. 1, the finder aperture 24 is on the side 2 of the camera frame and the finder eyepiece 15 is on the opposite side 38 of the camera frame. The finder shown is of the open-frame type but any conventional finder could be used instead.

Figs. 4 and 5 show how the special mechanism is arranged when the camera is set to feed only one frame of film in front of the film aperture for single-frame (movie) work; Fig. 4 shows clearly how the part 22 of the mask is now covering one half of the camera aperture 4 and the finder mask portion 23 covers one half of the finder (objective) aperture 24. At this setting the finder shows the field of view which is being photographed at the half-covered aperture 4. The dotted lines in Fig. 5 show how the gear change idlers swing around with the masks as they are both mounted on the same base piece 37. At the single-frame operating position the idler gear 19 is disengaged as it is moved back to a neutral position 39'. At the same time the idler 18 which previously was in a neutral position is moved to the position 38 where it engages a double length idler gear 39 which is operated by the large gear 16 and thus drives the shutter gear 15 at the same speed as the large gear drives the directly connected cam shaft gear 14. Thus, in this position, the cam drives the intermittent 11 one revolution to feed one frame of film 6 past the aperture 4 during one exposure cycle of the shutter 7. By this very simple arrangement, it is possible to set the camera mechanism so as to feed either one or two frames past the camera aperture for each exposure cycle of the shutter and at the same time by an infallible interlocking means, masks are moved simultaneously in front of one half of both the camera and finder apertures for single-frame operation and clear of both apertures for double-frame operation. Figs. 2 and 6 show how the same simple combination of actions can be secured, for the same reasons, when the intermittent cam and the shutter shafts are separated instead of revolving around a common axis as discussed above. Fig. 2 shows how the finder can be of a common optical type where a negative objective lens 25 is used and a positive eyepiece lens 34 is employed. An optical type finder is generally much more compact than the open type shown in Fig. 1 and may be preferred if the end of the camera were rounded as at 36 in Fig. 4. Another reason why the optical type of finder might be used is where the difference in the field being photographed might be compensated for by a supplementary lens such as indicated by 32 in Fig. 2.

Other than the finder, the camera parts are similar to those indicated in Fig. 1 except that the cam 10a of Fig. 2 is located on a shaft 40 at a considerable distance from the shutter shaft 8 and at a position more nearly central with respect to the shuttle upright 12 and the film 6. Also the cam shaft 40 is not hollow and is shown driven directly by the compound gears 16a—17a which also are firmly attached to the shaft 40. This arrangement makes for much greater simplicity of gearing and tends to facilitate the operation of the intermittent 11a as the load is centralized with respect to the cam and not to one side of the cam as in Fig. 1. The shutter shaft 8 carries a double length gear 26 which is driven either by the movable idler gear 41 (Fig. 6) at the same speed as the cam shaft gear 16a, as this gear engages the idler 41 in the single-frame combination, or the shutter shaft 8 is driven at half the speed of the cam shaft 40 when the idler gear 30 is moved to engage the half size gear 17a. The operation of this type of gear change is made clearer by further reference to Fig. 6 which shows the idler 30 engaged with the small gear 17a so that the shutter shaft gear 26 is driven at one half the speed of the gear 16a and the cam shaft 40, which setting feeds two frames before the aperture 4 for each exposure cycle of the shutter 7. At this double-frame setting the idler gear 41 is swung out of engagement with the large gear 16a and is at the neutral position 42. The dotted lines in Fig. 6 show how the gears swing around for single-frame operation. The gear 41 engages the gear 16a to drive the shutter gear 26 at the same speed, and the half speed idler 30 moves to the neutral position 43. At the same time the gears are so moved, the plate 37 which carries the idler gears 30 and 42 and the masks 22 and 23 moves these masks to cover up one half of the film aperture 4 and the finder aperture 23 respectively for one-frame operation and uncovers both apertures automatically when the gears are set for double frame operation. Fig. 2 indicates an alternative means of altering the finder field by mounting a supplementary lens 32 on a member 33 attached to the gear change frame piece 21 so that this supplementary lens 32 is moved into position in front of either the finder objective lens 25 or the finder eyepiece lens 34 but preferably in front of the eyepiece lens, to change the magnification of the finder system. In such a case the mask portion 23 can be quite small and thus make the entire finder system especially compact. The mask 23 is needed with the supplementary lens 32 as masking the aperture in half turns the picture frame around with respect to the long side of the frame being on the top and bottom as is generally necessary and which is mandatory for movie work. Thus this simple means also permits of changing from single-frame to double-frame operation and at the same time automatically masking and unmasking the film and finder apertures as before. Obviously other arrangements of gear change mechanisms can be employed instead but such substitutions are obvious and will not be described as it is the principle of the combined operation of the co-acting parts that is important.

One advantage of the arrangement shown in Fig. 2 is that there is left a space at 28 for a small speed control governor or a gear could be used at 28 to drive a higher speed governor of still greater sensitivity which could be located say at 29. It may be noticed that the gear change shown in Fig. 6 operates in the opposite direction to that shown in Fig. 5. In such a case the part 21 would be on the lower side of the shutter 7 instead of at the top as indicated in Figs. 3 and 4. This merely serves to point up the fact that many more or less obvious re-arrangements may be made without affecting the essential principles involved. Again it may be pointed out that the combination masking piece could be re-arranged without affecting the principle of operation as it is not necessary, though it may be desirable, that the pieces comprising this unit, namely 37, 21, 22, 23, 33, be of one piece or even a unit assembly. One or both of the masks could be separate and operated by a linkage, by hinged engaging members or by any other convenient interlocking means. But here again such variations are obvious to those skilled in the art and will not be described.

It is possible to effect considerable simplification of the mechanism and to eliminate all the complications of a gear change unit by using a special flexible type of intermittent shuttle arrangement which will interact automatically with the movable aperture mask when the mask is in front of half the film aperture and not to so interact when the mask is in the "open" position. Because this method of operation represents a variation of major importance the care needed to make and adjust the co-acting parts is well worthwhile and still cheaper than using a gear change. Also, this means is equally well adapted to regular size cameras as well as the very compact types primarily covered by this application. The savings and simplicity of the automatic operation offers many advantages when used in a very small camera having the double type operation described.

The functioning of the essential parts involved will be understood from a study of Figs. 7, 8 and 9 in conjunction with the following explanation. In Fig. 7 the film 6 is shown with the individual frames 44, 45, 46, 47 and 48 in position at the film aperture 4 in the aperture plate 5. The intermittent shuttle tooth or claw 13 is shown engaged in the perforation 51 at the beginning of the film feed stroke. The shuttle tooth 13 is shown as attached to a special curved (or wedged) flexible part 49 the construction and action of which contributes to the successful functioning of this arrangement. The flexible part 49 is shown as joined to the top of the upright piece 12 with a separation between this join and the position of the shuttle tooth 13. However, it is quite possible to put the shuttle tooth right above the part 12 and make this flexible and eliminate part or all of the piece 49. The action however is a little clearer when reviewed with the construction illustrated.

In either variation, it is vitally important that an extended preferably curved or wedged part 50 be included as this is the part that co-acts with the movable mask edge 22. During the feed stroke of the shuttle the tooth 13 moves the perforation 51 in which it is engaged towards the position 52. As it does this, the curved (or wedged) edge 50 of the flexible part 49 starts to engage the curved (or wedged) edge 22 which is half way across the aperture 4 to mask that aperture for single-frame operation. By the time the shuttle tooth 13 has reached the position 52, the co-acting functioning of the edges 50 and 22 have retracted the shuttle tooth 13 to the position 54 just barely out of engagement with the perforation 51. As the shuttle tooth continues on for a full double-frame length stroke, the continued co-acting functioning of the edges 50 and 22 keeps the shuttle tooth 13 out of engagement with the film 6 and the shuttle finally reaches a position shown in Fig. 8. At this part of the film feed cycle, the shuttle tooth has reached the far end of the aperture 4 at a position now occupied by the film perforation 52 but the shuttle tooth is not engaged in that perforation having left the film when the perforation 51 reached the half-way position across the aperture 4. From this description it is evident that the film frame 46, exposed before the shutter (not shown) had closed and the intermittent moved to start the feed stroke as in Fig. 7, has now been moved to a position in Fig. 8 where it is masked by the part 22 of the aperture mask and the frame 45, previously masked by the left-hand side of the aperture 4 in Fig. 7 is now moved to the open half of the aperture 4 in Fig. 8. Therefore, with the mask 22 in the position shown it is possible to have the intermittent shuttle move a full double-length feed stroke but only feed a single frame for exposure during the succeeding exposure cycle of the camera. Equally obvious is the fact that if the mask 22 is not in the position covering the half of the camera aperture 4, the co-acting functioning just described could not occur so that with the aperture 4 uncovered for a double-frame size picture, the intermittent shuttle tooth 4 would feed the film perforation 51 all the way across the aperture until it reached the position of the perforation 52 in Fig. 8.

Fig. 9 is included to show, by a part vertical section, how the flexible part 49 projects up above the level of the shuttle tooth 13 so that it can engage the mask edge 22 and how the shuttle tooth 13 can pass underneath the mask 22 during the second half of the stroke during which it is retracted from the film 6 as just described. Here again certain obvious re-arrangements of the various co-acting parts can easily be made without departing from the fundamental principle of the automatic operation just covered. As the principle is the important fact covered by this application no further constructional variations will be mentioned.

In conclusion, an important modification will briefly be covered to show how, for example the double-acting aperture and finder mask can be operated slidably instead of pivotably as previously described. Also, this modification shows how the same general principles can be used with a conventional type of camera using a conventional shutter and "straight-line" optical system.

Fig. 10 shows the essential parts of a typical camera of ordinary type in which the lens 56 is located at the end (or front) 35 of the case instead of on the side 2 as before. The lens 56 focuses the image directly on the aperture 4 of the aperture plate 5 and between the lens 56 and the aperture 4 is a conventional shutter 57 which can be of the disc, guillotine or other kind. While not shown for simplicity, a "barrel" type shutter could be used instead of the shutter 57 and this barrel shutter mounted on and revolved by the gear 58. Between the shutter 57 and the aperture 4 is a sliding mask with an opening 59 just slightly larger than the aperture 4. (It could be the same size or even slightly smaller, but is best made slightly larger.) In the position of this mask as shown in Fig. 10, the open part 59 is behind the aperture 4 so that the full aperture is left open. At the same time, the top end 60 of the mask is below the opening 61 of the finder mask. The finder in this camera arrangement is shown as having an objective lens 62 and with a field lens 63 just behind the finder mask 61. It is possible to make a finder to function as described without the field lens 63 or the mask 61 but this construction facilitates understanding and describing the functioning of a typical installation of the sort illustrated. In Fig. 10, a gear change unit is shown with two idler gears 64 and 65 mounted on a plate 66 which is attached to the sliding mask unit 59. In the position shown the gear 64 can be considered as driving the (shutter) gear 58 at half speed so that the shutter makes one revolution for two strokes of a single frame feed type intermittent (not shown) as is necessary for double-frame size picture operation as previously described. The 1:1 gear 65 is dis-engaged at this setting. When the camera is set for single-frame type operation, the mask 59 moves up until the bottom edge 67 is at the half-way position 68 across the aperture 4, where it masks the bottom half of the aperture 4. At the same time, the idlers are also moved up and the 1:2 idler 64 is now in the dis-engaged position 69 and the 1:1 idler 65 is now at 70 and engaged with the (shutter) gear 58. Also, at the same time, the top 60 of the mask 59 is moved to the position 71 so that an aperture 72 now is at a position 73 in front of the mask 61 and/or field lens 63 of the finder system. Thus by a simple sliding motion, such a camera could function as previously covered, without requiring the special "folded" type optical system mentioned before. It is equally obvious that the edge 67 (or the opposite edge) of the mask 59 could be constructed similarly to the edge 22 of the rotary type mask previously described so that the same co-acting method of operation could be used without employing a gear change at all. In this case the gears 58, 64 and 65 could be eliminated and a great simplification effected. Thus the identical (or similar) construction shown in Figs. 7, 8 and 9 could be used on an ordinary type camera to provide the double-acting type operation discussed. The means shown and described permit a very small and compact miniature camera to be constructed which will take either single frame movies or double-frame size (movie) sequence pictures and all of this to be done with very simple and beautifully fool-proof interlocking mechanism members. The important possibilities thus made evident are covered by the principles set forth in this application.

I claim:

1. A movie type camera, comprising a housing having an aperture plate having an aperture for exposing a film, a rotating cylindrical shutter having a peripheral wall provided with an exposure slit to expose said aperture, a view finder having its optical axis parallel to the axis of rotation of said shutter and disposed in close proximity to said shutter, film advancing means, means driving said shutter at a predetermined ratio with respect to said film advancing means, an arcuate member mounted for rotation about the axis of said shutter and adapted to be set to mask a predetermined portion of said aperture or to be retracted to unmasking position, a finder mask carried by said arcuate member and adapted to be positioned by said member to mask a portion of said finder corresponding to the portion of said aperture masked by said member, and means actuated by said member to vary said ratio to correspond to the unmasked portion of said aperture.

2. A movie type camera as set forth in claim 1 in which said shutter drive comprises a gear train including gear change members mounted to be shifted by movement of said arcuate member.

3. A movie type camera as set forth in claim 1 in which said film advancing means includes a flexible reciprocating member having a film feed shuttle tooth, a member having a cam surface carried by said arcuate member and shiftable therewith into a position to engage said flexible member and flex the same to withdraw said tooth from the film at a predetermined position corresponding to the unmasked portion of the aperture.

REGINALD FAWN MITCHELL.

REFERENCES CITED

The following references are of record in the file of this patent:

UNITED STATES PATENTS

| Number | Name | Date |
|---|---|---|
| 770,100 | Nessemann | Sept. 13, 1904 |
| 983,021 | Bingham | Jan. 31, 1911 |
| 1,997,130 | Weisse | Apr. 9, 1935 |
| 2,048,194 | Moreno | July 21, 1936 |
| 2,173,230 | Kellogg | Sept. 19, 1939 |
| 2,247,104 | Takacs | June 24, 1941 |
| 2,295,801 | Nagel | Sept. 15, 1942 |